United States Patent
Demarez et al.

[15] 3,692,365
[45] Sept. 19, 1972

[54] METHOD AND APPARATUS FOR REGULATING BRAKE CONTROL PRESSURE

[72] Inventors: Rene Demarez, Gennevilliers; Claude J. Dubois, Paris, both of France

[73] Assignee: Compagnie Des Freins Et Srgnaux Westinghouse, Freinville-Sevran, France

[22] Filed: Dec. 14, 1970

[21] Appl. No.: 97,509

[30] Foreign Application Priority Data
Dec. 12, 1969 France......................6943264

[52] U.S. Cl....................................303/3, 303/22 R
[51] Int. Cl.............................................B60t 13/74
[58] Field of Search..........192/2; 303/3, 16, 20, 22 R

[56] References Cited
UNITED STATES PATENTS

| | | | |
|---|---|---|---|
| 2,473,038 | 6/1949 | Rockwell | 303/3 X |
| 3,148,919 | 9/1964 | Simmons et al. | 303/3 |

*Primary Examiner*—Duane A. Reger
*Attorney*—Ralph W. McIntire, Jr.

[57] ABSTRACT

A friction/dynamic brake blending valve device is provided for a railway vehicle brake control system, in which a torque motor is arranged with opposing field windings so that its output shaft reflects the difference between an electric brake control current supplying one winding and an electrical signal representing the effective dynamic brake effort supplying the other winding. The output shaft acts through a lever arrangement to drive a pneumatic regulating valve which provides the necessary friction brake pressure to supplement the dynamic brake an amount sufficient to produce vehicle retardation, by the combined dynamic and friction brake efforts, corresponding to the brake control signal. The ratio of the output shaft torque to the pneumatic brake pressure is adjustable, in accordance with the vehicle load condition, through a movable fulcrum interposed between the lever arrangement connecting the output shaft and pneumatic regulating valve. Auxiliary pneumatic control means is provided to operate the pneumatic regulating valve through the lever arrangement independent of the torque motor to produce friction brake in the event electric failure renders the torque motor ineffective.

14 Claims, 1 Drawing Figure

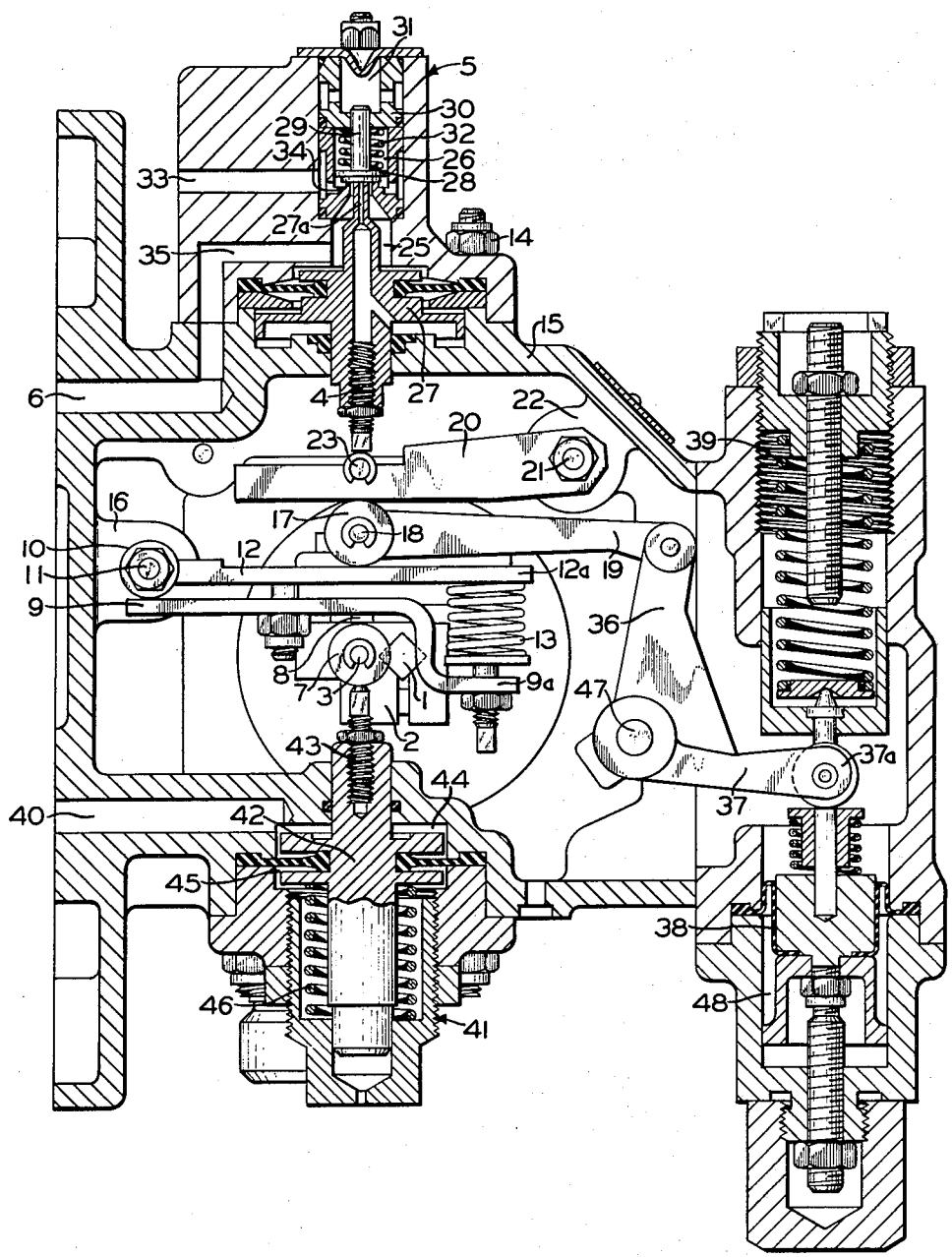

METHOD AND APPARATUS FOR REGULATING BRAKE CONTROL PRESSURE

The present invention is concerned with providing a device for continuously regulating pneumatic brake pressure on railway vehicles having electric traction motors, which by regenerative action produce dynamic brake effort, thereby supplementing the dynamic brake as it deviates from the desired brake command by reason of having an inherent delay during initial braking, surges during transition of the dynamic brake resistances, and a diminishing effectiveness at the time of approaching a stop.

Previous devices for obtaining a continuous blending of the friction and dynamic braking torque, in order to maintain a proportional relationship between the total vehicle brake effort and the effective brake command, have not been entirely satisfactory in that magnetically saturated parts and varying magnetic air gaps result in non-linear forces, precluding development of pneumatic brake pressure which is proportional to the brake command signal over the full range of braking.

In addition, it is necessary for safe operation to have a braking control which is entirely pneumatic. This pneumatic control is independent of the electric drive and runs the risk in cases involving emergency braking of superimposing the pneumatic braking at maximum pressure on the dynamic brake, leading to skidding which can wear down the vehicle wheels and damage rails.

The invention lessens the disadvantages mentioned above and is concerned with proposing a process for obtaining a characteristic with respect to the total dynamic and pneumatic braking torque which is a linear function of the intensity of the drive current. The invention is also concerned with proposing a device permitting implementation of the process.

Towards this objective, the process for regulating the pneumatic brake pressure on a vehicle by a continuous drive current in which at least part of the current coming from dynamic braking associated with a continuous electric current is characterized by the fact that the dynamic brake electric current and the electric drive current produce a single mechanical torque. The latter is applied to a pneumatic control device capable of supplying the fluid under a pressure proportional to the mechanical torque.

According to other characteristics, the magnetic field produced by the electric drive and dynamic brake currents is in the opposite direction and the ratio between the magnetic field produced by the dynamic brake electric current and the magnetic field produced by the electric drive current is equal to the ratio between the braking torque produced by the dynamic brake electric current and the braking torque produced by the fluid under pressure emitted by the braking drive under the action of the electric drive current acting by itself. This process for the regulation of the braking fluid pressure using an electric current makes it possible to instantaneously obtain the total braking torque required by the braking controller device of a vehicle, no matter what the dynamic brake effectiveness, which eliminates the risk of an accidental elongation of the stopping distances due to an error of manipulation on the dynamic brake.

According to another characteristic of the invention, the mechanical torque is proportional to the intensity of the electric drive current when the electric dynamic brake current is eliminated.

This permits, in the case where the blending between the dynamic brake and the pneumatic brake is not desired, control of the braking devices by means of a single electric drive current. In addition, it is therefore perfectly feasible to obtain an adjustable braking involving the application and release of pneumatic brakes on the vehicle by means of an electric control current even if the vehicle does not contain a dynamic braking circuit.

The device for setting up the process for regulating the braking fluid pressure of a vehicle according to the invention is of the type containing at least one brake control device effective between a source of fluid under pressure and braking devices characterized by the fact that there is a separately excited electric torque motor, involving for example, the use of permanent magnets. At least one armature winding of these magnets is supplied by the electric drive current and another armature winding may be supplied by the dynamic brake electric current. The above device is also characterized by the fact that the output shaft of the torque motor is linked to a connecting part which cooperates with a movable rod in the braking drive. Auxiliary braking devices may act separately or simultaneously on the latter. Due to the linear characteristics of this electro-mechanical device, it is possible to distribute a braking pressure which is strictly proportional to the drive current and to completely counterbalance the dynamic braking torque.

In order to improve the proportionality between the dynamic braking torque and the torque produced by the dynamic brake current in the case where dynamic braking is achieved by motors connected in series, part of the dynamic braking current feeds an inducing coil to produce a magnetic field opposite that of the separately-excited torque motor, and, in the case where braking is achieved by separately excited motors, at least part of the current of this separate excitation feeds an inducing coil to produce a magnetic field opposite that of the separately excited torque motor. This arrangement makes it possible to impose the "excitation-dynamic brake current" product upon the torque motor, which gives a better picture of the dynamic braking torque.

In order to assure a continuous modulation of the braking in accordance with the vehicle load condition, an additional inducing coil is fed by an electric current increasing as a function of the load supported by the vehicle, to produce a magnetic field in the same direction as that of the separate excitation of the torque motor.

Whenever an indication of the vehicle load is available in the form of electrical intensity, the characteristic of the device according to the invention makes it possible to vary, as a function of the load, the ratio between the electric drive current and the braking fluid pressure.

According to another characteristic of the invention which is very important for safeness of the device in the case of braking with respect to railroad cars, an auxiliary braking means consists of a pneumatic back-up valve comprising a piston or movable abutment connected to a pushnrod acting on the connecting piece and submitted to the action of a braking-power spring acting on one of the surfaces of the piston connected to the atmosphere, while the other surface is subject to the pressure exerted in a general braking pipe. This auxiliary method of braking makes it possible to assure pneumatic braking in the case of breakdown of the electric control circuits.

According to another practical way of setting up the invention, the connecting piece cooperates with the movable rod of the self-lapping valve on the one hand via the intervention of a first lever pivotable on a shaft perpendicular to the shaft of the movable rod and on the other hand via a fixed thrust block on a second lever pivotable on the hub of the shaft of the first lever. The two levers are connected at one of their extremities by an adjustable spring.

These kinematic drive connections for operating the self-lapping valve have the advantage of making it possible to transform the rotational movement of the torque motor into a linear displacement with a minimum amount of friction.

According to other characteristics, the free movement of the piston or movable abutment of the pneumatic back-up valve is, in addition, equal to the movement of the spring device acting on the first lever under the influence of the maximum drive torque permissible for the torque motor, in such a way as to limit the braking pressure supplied by the self-lapping valve in cases where there is a simultaneous drive furnished by the torque motor and the auxiliary pneumatic back-up valve.

Finally, according to a last characteristic, a third pivotable lever is perpendicular to and engageable with the movable rod of the self-lapping valve. Located between the first lever and the third lever is a fulcrum connected to a lever that is capable of moving the fulcrum under the action of a piston or a movable abutment subject on one of its surfaces to a pressure proportional to the load of the vehicle to be braked and on the other surface to the force of a release-spring.

This technological arrangement makes it possible to optionally insure a correction of the braking rate as a function of the vehicle load, especially where air spring pressure is available as a control signal which varies with the load.

Other characteristics and advantages may be seen in a description given below by way of an indicative but unlimited example, as well as in the attached drawing on which the single FIG. displayed is a sectional view of a device according to one method of applying the invention.

The device permitting the regulation of the braking fluid pressure of a vehicle by means of a continuous electric current is essentially composed of a torque motor combined with a drive device, which may be a pneumatic self-lapping valve which operates in a well known manner.

The torque motor is excited separately and preferably consists of permanent magnets which form the poles of the inductor, and an armature in the notches of which are lodged a first winding supplied by the electric drive current and a second winding simultaneously supplied by a current proportional to the braking torque produced by the dynamic brake. The ampere-turns of this latter winding are placed in a direction opposite that of the first winding and the ratio between the number of ampere-turns furnished in service for each of these windings is basically equal to the ratio between the braking torque furnished by the dynamic brake and the braking torque furnished by the fluid pressure braking devices controlled by the self-lapping valve in the absence of a dynamic braking current.

Thus, a mechanical torque is obtained on the torque motor output shaft which is proportional to the algebraic sum of the effective ampere-turns of the armature and which is constant for a relatively small angle of rotation of the shaft of the motor. This mechanical torque makes it possible to obtain at a certain distance from the axis of the motor shaft a tangential force proportional to the sum of the effective ampere-turns of the armature which, combined with a self-lapping valve, transforms the electric drive and dynamic brake currents into a pneumatic pressure which is a function of the resulting intensity of the current on the armature in order to obtain an essentially linear characteristic.

When an electric traction motor is used of a series nature for dynamic braking, by connecting resistances whose value decreases with the speed, the braking torque of the motor in series is essentially proportional to the square of the dynamic supplied by the motor connected in series functioning as a generator. Actually, in order to stabilize the dynamic braking, the series motors are supplied with mixed excitation (separate and in series) and a servo-motor maintains the rheostatic current basically constant until it approaches stoppage by progressively diminishing the load resistances. The part of the dynamic current feeding the torque motor thus acts almost as an all-or-nothing signal.

For technological reasons, a torque motor is used whose inductor has four poles with permanent magnets. Meanwhile, the armature connected to the output shaft of the torque motor comprises two groups of windings which are separate and identical to those of a continuous current motor, but which are permanently linked by flexible connections with the feeding terminals carrying dynamic brake and drive current. It is obvious that it is also possible to place the poles with permanent magnets (or with separate excitation furnished by a continuous current source) on the shaft of the torque motor while the windings supplied by the drive and dynamic brake currents are attached to the frame of the torque motor. In both cases, the characteristic of the torque motor of furnishing a mechanical torque proportional to the number of ampere-turns of the armature is maintained.

In the device represented on the only FIGURE, shaft 1 of a torque motor, which is not represented, is arranged with its square-section output shaft suitably attached to a connecting piece 2 in the form of an L. On this connecting piece is attached a shaft 3 which is arranged perpendicularly to the direction of movement of a movable rod 4 of a self-lapping pilot 5 attached by bolts 14 to body 15 of the device according to the invention and which is connected by a pipe 6 to braking devices which are not represented. Ball bearing 7 is mounted on shaft 3 of connecting piece 2. This ball bearing is supported against thrust block 8 secured to lever 9 whose extremity is placed on hub 10 of shaft 11 on which lever 12 is pivoted. Shaft 11 is attached to lug 16 which is integral with body 15. Levers 9 and 12 are connected at their respective ends 9a and 12a by means of an elastic device 13 such as a helical spring which is adjustable.

Lever 12 is supported against ball bearing 17 mounted on a shaft 18 attached to a lever 19. Ball bearing 17 cooperates with lever 20 whose one end is free and whose other end is pivoted on shaft 21 mounted on lug 22 which is integral with body 15 of the device. Shaft 23 attached to lever 20 is capable of cooperating with movable rod 4 of self-lapping pilot valve 5, which comprises two chambers 25 and 26 separated by poppet valve 28. A hollow piston 27 is operable in chamber 25. This hollow piston carries rod 4, and is supported against poppet-valve 28 by its hollow end 27a. Valve 28 is integral with a valve stem 29 which is in itself guided through a bore in wall 30 provided between chamber 26 and a third chamber 31. On the other hand, valve 28 is biased against seat 34 by spring 32. Chamber 26 is supplied with fluid under pressure via a pipe 33, while chamber 25 is connected to the braking devices by pipe 6 and passage 35. Lever 19 is comprised of two other levers 36 and 37 pivotable relative to each other about one of their ends on a shaft 47. The free end 37a of lever 37 is moved under the action of a piston or abutment 38 of a variable load valve. Abutment 38 is subjected on one of its faces to the pressure exerted in chamber 48 (pressure which is proportional to the load of the vehicle to be braked) and on the other face to the force of a release-spring 39 acting through end 37a of lever 37.

In addition, means is provided for controlling self-lapping valve 5 via a general braking pipe 40. This means consists of pneumatic back-up valve 41 comprising piston 42, which is connected to push-rod 43, acting on bearing 7 of connecting piece 2. Piston 42 defines two chambers 44 and 45 in valve 41. Chamber 44 is connected to general braking pipe 40 while chamber 45 is connected to the atmosphere. A drive spring 46 is lodged in chamber 45 and is supported on piston 42 and on the base of safety-valve 41.

The functioning of the device according to the invention is described below. When a torque force is produced on shaft 1 of the torque motor, connecting piece 2 pivots around shaft 3 and moves lever 9 by means of fixed thrust block 8. Lever 12, which is movable with lever 9 by spring 13, acts through bearing 17 to cause pivoting of lever 20. Shaft 23 of lever 20 pushes movable rod 4 upwards in such a way as to apply end 27a of piston 27 to poppet-valve 28 in order to isolate chamber 25 from the atmosphere poppet-valve of an internal passage in piston 27. Beginning with a certain value of mechanical torque on shaft 1, poppet-valve 28 opens and a braking pressure appears in chamber 25.

As soon as the reaction force exerted on piston 27 by the pressure in chamber 25 balances the mechanical torque effective on shaft 1, poppet-valve 28 is closed by spring 32, terminating the supply of pressure to chamber 25. The self-lapping valve is balanced at this point so that end 27a of piston 20 remains in contact with poppet-valve 28, preventing exhaust of delivery pressure from passage 33 to atmosphere via the internal passage of piston 27. A subsequent reduction in the net torque force exerted on the movable rod 4 will permit the exhaust of pneumatic pressure until the balanced condition is again achieved. Self-lapping valve 5 functions throughout the region of braking pressures as a regulating valve operable to control delivery and exhaust of brake application pressure in accordance with the torque motor output.

When the operator gives a braking drive order represented by an intensity of the drive current such that the ampere-turns of the dynamic braking current to be exceeded, a total braking effort (rheostatic and pneumatic) is established on the vehicle. This braking effort or retardation is maintained essentially constant and proportional to the drive current until the vehicle stops.

The variations in load in the vehicle (this load being represented by the pressure exerted in chamber 48) cause ball bearing 17 to be displaced along levers 12 and 20 through the action of lever 19 in response to movement of piston 38 against spring 39. This changes the ratio of transmission of force between levers 12 and 20, and as a consequence, the ratio between the drive current and the pneumatic braking pressure supplied to chamber 25. If it is not desired to have a correction of the braking rate intervene as a function of the load, it suffices to remove the portion of body 15 housing abutment 38 and spring 39 as well as levers 19, 36 and 37 and to close the opening with a cover plate in place of this portion. In order to replace bearing 17, a screw permanently attached to one of levers 12 or 20 or an extension of rod 4 may be used in cases where lever 20 is eliminated. It is also possible to arrange lever 19 to be pivotally secured to body 15 of the device. Thus, by displacement of lever 19, a range of ratios are possible between the intensity of drive current and the pneumatic pressure produced by valve 5.

When the electric drive circuit does not function normally, it is possible to control the braking via pneumatic back-up valve 41. It is sufficient for this that the operator of the vehicle lower the pressure of general braking pipe 40 to a value lower than that normally maintaining drive spring 46 under compression. Push-rod 43 is effective under the increasing influence of spring 43 to exert a force on bearing 7 proportional to the pressure reduction in pipe 40, and directed in the same direction as the torque produced by the drive current. As before, the torque produced by the dynamic brake current opposes this drive force and self-lapping valve 5 furnishes a pressure proportional to the desired pneumatic braking torque, but reduced an amount corresponding to the effective dynamic brake, to give, in combination with the dynamic brake torque, a total braking torque proportional to the drop in pressure in the general pipe. It should be noted that during the increase in drive torque of shaft 1, extremity 9a of lever 9 is moved to compress spring 13 and thus submit lever 12, which practically does not move at all, to an increasing force. The movement available in chamber 44 for piston 42 is made equal to the movement of bearing 7 under the effect of a maximum drive current in the absence of a dynamic brake current when chamber 25 is under maximum braking pressure. Spring 13 is adjusted to permit levers 9 and 12 to increasingly collapse should the force transmitted by connecting piece 2, under the combined effect of the torque on output shaft 1 and the force at push rod 43, exceed a value corresponding to the maximum permissible torque motor drive. Because of this, if the operator mistakenly releases the pneumatic control pressure via general pipe 40 simultaneously with the electric drive current, the maximum braking provided will not exceed the maximum which can be provided by the electric drive current.

In general, since dynamic braking is used to diminish wear and tear on the pneumatic brake equipment, it is routinely used for every slowing-down operation that is not an emergency. In the customary devices used for dynamic braking, traction motors of a series nature are connected by graduation resistances whose contacts are controlled by a servo-motor. This maintains the intensity and the torque of dynamic braking constant up to a maximum speed starting from which the torque decreases very rapidly.

In the above case, in order to have a workable picture of the dynamic braking torque, it suffices to shunt one part of the dynamic braking intensity and to add it to the corresponding winding of the torque motor. With such devices, the pneumatic-braking electric drive is blended with the dynamic braking electric drive which is increasingly diminished upon each slowing-down procedure.

If it is desired to use the device according to the invention in a vehicle for which the torque value of dynamic braking could vary considerably (for example, a locomotive functioning via regenerative action), it is also possible to introduce (by means of a simple shunt stimulation) dynamic brake electric currents giving shaft 1 a torque opposite that produced by the electric drive current and proportional to the dynamic braking torque. For this reason, in the case of a motor in series functioning via dynamic braking with series excitation, rheostatic ampere-turns are added to the torque motor opposite the drive apere-turns, on the inductor and induced windings. In the case of a traction motor functioning via separate excitation, part of the separate-excitation current is introduced to an indicator winding of the torque motor, while the armature current of the traction motor functioning via regenerative action is normally introduced to an armature winding of the torque motor. The braking device and process according to the invention are preferably applied to railroad vehicles traveling at a very great speed and exerting their entire braking program at a great speed by dynamic braking or to urban transit railroad vehicles having a dynamic braking system. In urban transit vehicles with metallic or pneumatic tires, braking is very frequent and very intense and the device according to the invention prevents braking in spurts during blending of the pneumatic brake and the dynamic brake and contributes to the comfort of the travelers.

Having now described the invention what we claim as new and desire to secure by Letters Patent, is:

1. An electric to fluid pressure transducer valve device for regulating the braking fluid pressure of a vehicle comprising:
   a. a torque motor having plural winding means arranged to provide a single mechanical torque force at the motor output shaft, a first one of said windings being energizable in accordance with a continuous electric drive current corresponding to the desired brake effect on said vehicle and a second one of said windings being energizable with current representa-tive of the effective dynamic braking on said vehicle,
   b. self-lapping valve means for providing said braking fluid pressure in accordance with the degree of actuating force applied thereto, and
   c. means interconnecting said output shaft and said self-lapping valve means for transmitting an actuating force thereto proportional to the torque force effective at said motor output shaft.

2. The combination, as recited in claim 1, further characterized in that the magnetic fields produced by said first and second winding means act in opposite directions so that said torque force reflects the deficiency of the dynamic brake in providing the desired brake effect on said vehicle.

3. The combination, as recited in claim 2, further characterized in that the ratio between the magnetic fields produced by said winding means is equal to the ratio between the braking effect produced by the output pressure of said self-lapping valve means under the effect of the electric drive current acting alone and the dynamic braking effect on said vehicle.

4. The combination, as recited in claim 1, further characterized in that the single mechanical torque at said output shaft is proportional to the intensity of current in said first winding means in the absence of current in said second winding means.

5. The combination, as recited in claim 1, further characterized in that a third one of said winding means is energizable with current varying in accordance with the load supported by said vehicle and produces a magnetic field in the same direction as that of said first winding means.

6. The combination, as recited in claim 1, further comprising auxiliary control means acting on said interconnecting means for providing an actuating force to said self-lapping valve means in parallel with said torque motor.

7. The combination, as recited in claim 6, further comprising:
   a. said interconnecting means including a connecting piece linked to said output shaft, and
   b. said auxiliary control means comprises a back-up valve device having a movable piston abutment subject opposingly to the force of a spring acting on one side and a control fluid pressure acting on the other side, said piston abutment having a push rod engageable with said connecting piece to exert the differential force of said piston abutment thereon.

8. The combination, as recited in claim 7, wherein said interconnecting means further comprises a first lever pivotally connected on one end to a shaft perpendicular to the direction of movement of said self-lapping valve means and cooperative with said connecting piece for transmitting said actuating force to said self-lapping valve means.

9. The combination, as recited in claim 8, wherein said interconnecting means further comprises:
   a. a second lever in substantially parallel spaced-apart relation with said first lever and having one end pivotally supported at a point substantially corresponding to the pivot point of said first lever, and b. elastic means for resiliently connecting the ends of said first and second levers opposite said pivotal ends.

10. The combination, as recited in claim 9, further characterized in that movement of said piston abutment in a direction to exert said differential force on said self-lapping valve means is limited to an amount corresponding substantially to the degree of deflection of said elastic means under the influence of the maximum torque force generated by said torque motor at the output shaft thereof to prevent the braking fluid pressure of said self-lapping valve means from exceeding a value corresponding to said maximum torque force in the event of operation of said back-up valve means concurrently with energization of said torque motor.

11. The combination, as recited in claim 10, further comprising:

a. said interconnecting means including a third lever in substantially parallel spaced-apart relation with said second lever and pivotally secured at one end to a shaft perpendicular to the axis of a movable rod extending from said self-lapping valve means and engageable with said movable rod, b. a fulcrum member movably disposed in the space provided between said second and third levers for engagement therewith to transmit said actuating force to said self-lapping valve means, c. said auxiliary control means further comprising a load compensating valve device having a movable piston abutment subject on one side to a pressure proportional to the load supported by said vehicle and on the opposite side to the force of a release spring, and d. linkage means cooperating with said piston abutment for displacing said fulcrum member in the space between said first and second levers in accordance with movement of the piston abutment of said load compensating valve device to thereby adjust the actuating force applied to said self-lapping valve means.

12. The combination, as recited in claim 11, further characterized in that said second and third lever pivot points are located adjacent opposite sides of said fulcrum member so that said interconnecting means supplies said actuating force to said self-lapping valve means with increased mechanical advantage responsive to displacement of said fulcrum member in one direction and with decreased mechanical advantage responsive to displacement of said fulcrum member in the opposite direction.

13. The combination, as recited in claim 12, further characterized in that the movable rod of said self-lapping valve means is engageable with said third lever at a point lying on a straight line passing through substantially the midpoint of the active length of said first lever and said fulcrum member when the latter is positioned in accordance with a substantially medium condition of vehicle load.

14. The combination, as recited in claim 1, further comprising:

a. said interconnecting means including first and second levers pivotally connected at their opposite ends and disposed in substantially parallel spaced-apart relation perpendicular to the direction of application of said torque force to the first one of said levers, b. a fulcrum member movably disposed in the space provided between said first and second levers and engageable therewith, c. said auxiliary control means including a load compensating valve device having a piston abutment movable responsive to the force differential of fluid pressure proportional to the load supported by said vehicle acting on one side of said piston abutment and to a release spring on the other side thereof, d. linkage means cooperating with said piston abutment for displacing said fulcrum member in the space between said first and second levers in accordance with movement of said piston abutment responsive to said differential to thereby adjust the actuating force applied to said self-lapping valve means.

* * * * *